Jan. 5, 1971     A. R. GEDANCE     3,553,593

PULSE WIDTH MEASURING CIRCUIT

Filed Jan. 10, 1968     2 Sheets-Sheet 1

WITNESSES:
Leon M. Garman
James F. Young

INVENTOR
Alan R. Gedance
BY
Donald C. Lackey
ATTORNEY

United States Patent Office 3,553,593
Patented Jan. 5, 1971

3,553,593
PULSE WIDTH MEASURING CIRCUIT
Alan R. Gedance, Severna Park, Md., assignor to Westinghouse Electric Corporation, Pittsburgh, Pa., a corporation of Pennsylvania
Filed Jan. 10, 1968, Ser. No. 696,830
Int. Cl. H03k 5/20
U.S. Cl. 328—112                                    11 Claims

ABSTRACT OF THE DISCLOSURE

A pulse width measuring circuit which provides a rectangular output pulse having a width equal to the width of the pulse to be measured at a pre-selected level below its peak amplitude.

BACKGROUND OF THE INVENTION

(1) Field of the invention

The invention relates in general to pulse width measuring circuits and apparatus, and more specifically to pulse width measuring circuits and apparatus which will accurately measure the width of a pulse at a predetermined level below the peak amplitude of the pulse, over a wide range of pulse amplitudes.

(2) Description of the prior art

Certain types of electronic equipment require circuit decisions to be made on the basis of the width, i.e., the time duration, of a signal pulse. Because the pulses have a finite rise and fall time, it is important that the pulse width be measured at a predetermined location in the pulse waveform. In the prior art, it is common to measure the pulse width when the pulse reaches a predetermined fixed voltage level. This method, however, makes the accuracy of the measurement depend upon the amplitude of the signal pulse. For example, the lower the pulse amplitude, the shorter the pulse width, as determined by this method.

It would be desirable to be able to measure the width of a signal pulse at a point in the waveform which is a predetermined percentage of the peak amplitude of the signal pulse. Thus, the pulse width measuring apparatus would, in effect, be insensitive to amplitude changes, always measuring the width of the pulse at the same point in the waveform with respect to the peak amplitude of the pulse.

SUMMARY OF THE INVENTION

Briefly, the invention comprises new and improved pulse width measuring circuitry and apparatus, which will measure the width of a signal pulse at a predetermined level below the peak amplitude of the pulse, over a wide range of pulse amplitudes.

The signal pulse to be measured, after being received, is processed in two independent circuits. The first circuit includes delay means, with the signal pulse appearing at its output terminals a predetermined period of time after it is applied to its input terminals. The second circuit includes peak detector and storage means, which provides a unidirectional signal having a magnitude responsive to the peak magnitude of the signal pulse. The first and second circuits are connected to adjustable threshold means which provides a rectangular output pulse during the period of time that a first voltage has a predetermined relationship with a second or control voltage. The second circuit, which provides a signal responsive to the peak magnitude of the signal pulse, is connected to the adjustable threshold means to provide the second or control voltage. The first circuit, which provides the delayed signal pulse, is connected to provide the first voltage for the adjustable threshold means. The time delay of the signal pulse of the first circuit is selected such that the delayed signal pulse is applied to the adjustable threshold means after the adjustable threshold means has been pre-set or adjusted by the control signal from the second circuit. The adjustable threshold means provides a rectangular output pulse of predetermined fixed magnitude, having a width or time duration equal to the width of the signal pulse at the predetermined selected level relative to the peak magnitude of the signal pulse.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

Figure 1:
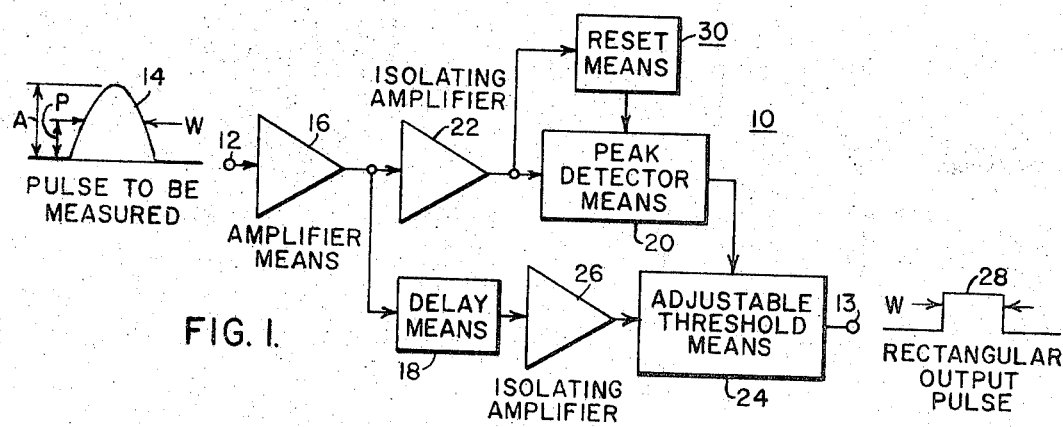
FIG. 1 is a block diagram illustrating a pulse width measuring system constructed according to the teachings of the invention.

Referring now to the drawings, and FIG. 1 in particular, there is shown a block diagram of a pulse width measuring circuit, indicated generally with the reference numeral 10, which will measure the width of a signal pulse at the same position in the signal pulse waveform, relative to its peak magnitude, regardless of the magnitude of its peak amplitude. In other words, the measuring point in the waveform will always be a predetermined percentage of the peak amplitude.

Circuit 10 has an input terminal 12 adapted for connection to the apparatus which is to supply the signal pulse to be measured. A typical signal pulse whose width is to be measured is shown in FIG. 1 and given the reference numeral 14. Signal pulse 14 has a peak amplitude A, and a width W, measured at an amplitude P in the pulse waveform. If the amplitude P is a constant, as in certain prior art pulse width measuring systems, the measurement will change as the amplitude of the pulses to be measured changes, measuring shorter pulse widths as the signal pulse amplitude is reduced, and longer pulse widths as the signal pulse amplitude increases. This invention, instead of measuring the pulse width at a constant magnitude P, measures the pulse width such that the ratio of P to A is a constant. The measuring point in the waveform is always a predetermined fixed percentage of the peak amplitude of the waveform.

Pulse width measuring circuit 10, after receiving the signal pulse 14 at its input terminal 12, may be amplified in amplifier means 16. Amplifier means 16 may be a linear amplifier, or a logarithmic amplifier. The latter possesses certain advantages when used in the pulse width measuring circuit 10, which will be hereinafter explained.

After being amplified in the amplifier means 16, the signal pulse 14 is applied to two independent circuits. The first circuit includes delay means 18, and the second circuit includes peak detector means 20.

The delay means 18 of the first circuit may be an electro-magnetic delay line, which has the characteristic that a signal applied to its input terminals appears at its output terminals at the end of a time interval or time delay $t_d$.

The peak detector means 20 of the second circuit may be an asymmetrically conductive device and a capacitor, connected to charge the capacitor to the peak magnitude of the signal pulse. The second circuit may also include a unity gain isolating amplifier 22 disposed between amplifier means 16 and peak detector means 20, to prevent the peak detector means 20 from loading the amplifier means 16.

Thus, the peak detector means 20 provides a unidirectional output voltage, i.e., the voltage across the charged capacitor, having a magnitude responsive to the peak magnitude of the signal pulse. The delay means 18 provides the signal pulse at its output terminals, after a time delay $t_d$. The time delay $t_d$ is selected such that the signal pulse appears at the output terminals of the delay means 18 after the unidirectional voltage responsive to the peak magnitude of the signal pulse has been provided by peak detector means 20.

The output terminals of peak detector means 20 and of delay means 18 are connected to adjustable threshold means 24. Delay means 18 may be connected to adjustable threshold means 24 through an isolating amplifier 26, if desired.

Adjustable threshold means 24 should have the characteristic of providing a rectangular output voltage or pulse at terminal 13 when the magnitude of the delayed signal pulse from the delay means 18 has a predetermined relationship with the magnitude of the output voltage from peak detector means 20. Thus, the rectangular output pulse will be initiated when the leading edge of the signal pulse reaches a magnitude having the predetermined relationship with the peak magnitude of the signal pulse, and the rectangular output pulse will be terminated when the trailing edge of the signal pulse drops below the magnitude having the predetermined relationship with the peak magnitude of the signal pulse. The rectangular output pulse, shown in FIG. 1 and indicated with reference numeral 28, will thus have a width or time duration W, which is equal to the width W of the signal pulse 14, at a point in the waveform where the ratio of the magnitude P of the measuring point, to the peak magnitude A of the signal pulse, has the predetermined selected relationship.

Adjustable threshold means 24 may be an emitter coupled differential amplifier, with one of its inputs being connected to the delay means 18, and the other of its inputs connected to the peak detector means 20. In other words, the unidirectional voltage from the peak detector means 20 is used as a control voltage to pre-set the operating point of the differential amplifier for the particular pulse which will be shortly applied to the other input terminal of the differential amplifier. If the amplifier means 16 is a linear amplifier, adjustable threhold means 24 should be set to provide an output voltage when the signal pulse magnitude reaches a predetermined percentage of the peak magnitude. For example, if it is desired to measure the width of the signal pulse at a magnitude which is 50% of the peak magnitude of the signal pulse, the adjustable threshold means should be biased to provide an output signal when the magnitude of the signal pulse reaches 50% of the magnitude of the control voltage provided by the peak detector. Thus, regardless of the peak magnitude of the signal pulse, the signal pulse will always be measured at a point which is 50% of its peak amplitude.

If amplifier means 16 is a logarithmic amplifier, the adjustable threshold means should be arranged to provide an output signal when the signal pulse reaches a magnitude equal to the peak magnitude minus a predetermined fixed amount. For example, if the adjustable threshold means 24 is adjusted to provide an output signal when the signal pulse is .3 volt less than the measured peak, the measurement of the pulse width will always be at the 50% magnitude point of the waveform, regardless of the peak amplitude of the signal pulse. This may be readily understood by examining the logarithm of a few selected numbers. The log of 100 is 2, the log of 50 is 1.7, and the log of 25 is 1.4. Thus, 50% of a number reduces its logarithm by .3. Setting the adjustable threshold means 24 to provide an output signal when the signal pulse is within .3 volt of the peak amplitude will, therefore, measure the pulse width at the 50% of peak magnitude point. Thus, the pulse width may be measured at any desired point in the waveform, by selecting the predetermined fixed amount less than the peak magnitude at which the adjustable threshold means is to provide an output signal. Using a logarithmic amplifier for amplifier means 16, thus has several distinct advantages. It extends the range of the pulse width measuring circuit 10, and it makes it more accurate. All of the circuit constants, such as thresholds and other voltage drops, may be lumped into the fixed value which is subtracted from the peak magnitude to obtain the operating point of the adjustable threshold means 24.

Since peak detector means 20 measures the peak amplitude of the signal pulse, and stores a voltage charge responsive to this peak, which is used to provide the control voltage of the adjustable threshold means 24, as soon as the rectangular output pulse 24 has been generated, the peak detector means 20 should be reset, i.e., the capacitor of the peak detector means should be discharged. As shown in FIG. 1, reset means 30 may be connected to also receive the signal pulse, such as from the output of the isolating amplifier 22, and reset means 30 may be arranged to provide a reset pulse a predetermined period of time later, which pulse activates switching means in peak detector 20 to discharge the capacitor therein and reset the circuit to await the next signal pulse. The time delay in the reset means should be selected to initiate the reset signal pulse after the rectangular output pulse from adjustable threshold means 24 has been terminated.

Figure 2:
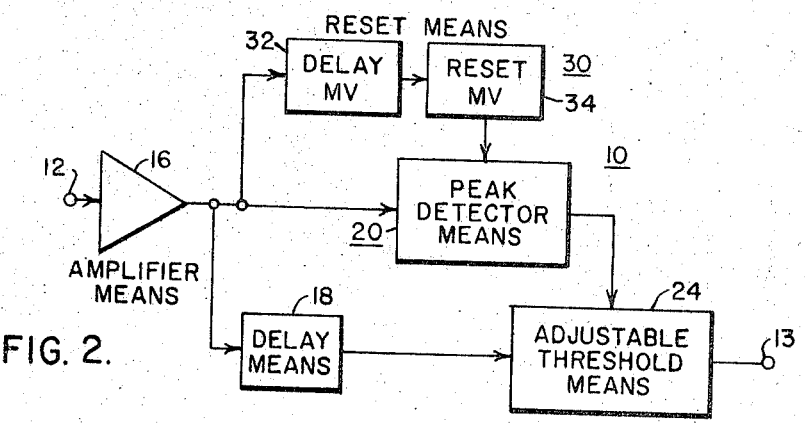
FIGS. 2 and 3 are block diagrams illustrating two different reset systems which may be used with the basic circuit shown in FIG. 1.

Reset means 30 may function in any one of several ways. For example, as shown in FIG. 2, which illustrates the pulse width measuring circuit of FIG. 1 with the isolating amplifiers omitted, the reset means 30 may include a delay multivibrator 32 and a reset multivibrator 34. The delay multivibrator is triggered by the front or leading edge of the signal pulse. The trailing edge of the pulse produced by the delay multivibrator occurs sometime after the trailing edge of the delayed signal pulse. The reset multivibrator 34 provides a pulse in response to the trailing edge of the delay multivibrator 32, producing a pulse which activates switching means in the peak detector means 20, discharging the capacitor in the peak detector circuit.

Figure 3:
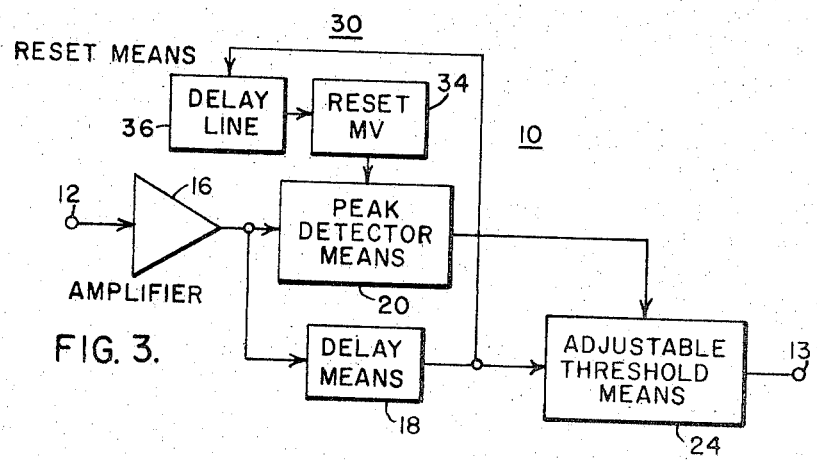

FIG. 3 illustrates another embodiment of the reset means 30, wherein the trailing edge of the delayed signal pulse is delayed, either in a delay line 36 or a delay multivibrator, and the output of the delay line 36 actuates a reset multivibrator 34 which provides the reset pulse.

Figure 4:
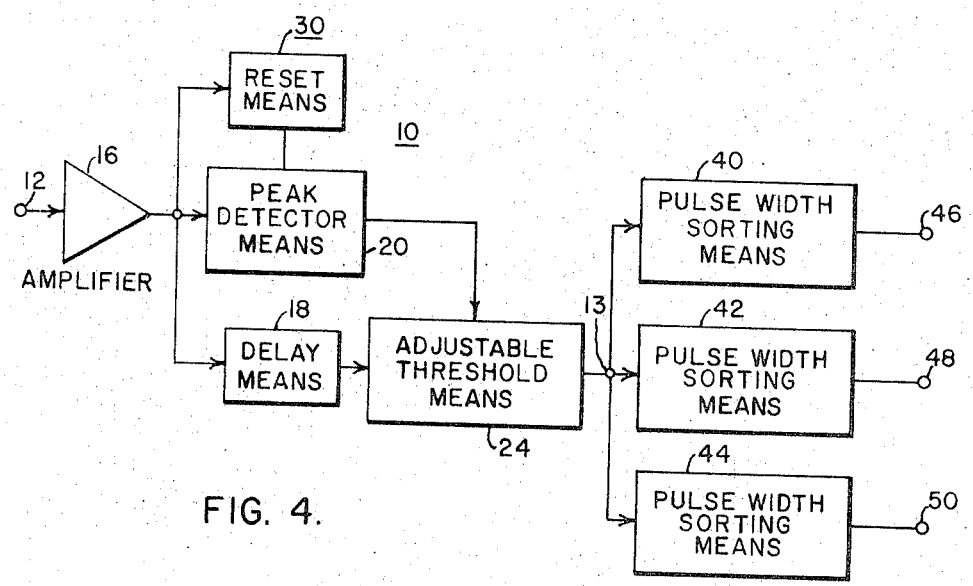
FIG. 4 is a block diagram illustrating the teachings of the invention shown in FIG. 1 applied to a plurality of pulse sorting means.

The function of shaping the signal pulse 14 into a rectangular pulse 28 of predetermined fixed magnitude, having a width W equal to the width W of the signal pulse at the desired predetermined location in the signal pulse waveform, may be used in any one of a plurality of different applications. For example, as shown in FIG. 4, pulse width measuring circuit 10 may convert a train of signal pulses of varying amplitudes and having appreciable rise and fall times, into a train of pulses of uniform amplitude, having durations corresponding to the durations of their associated signal pulses, as measured at a predetermined number of decibels below the peak amplitude of the signal pulses. The processed train of pulses appearing at output terminal 13 is fed to one or more pulse width sorting means, such as pulse width sorting means 40, 42, and 44. Pulse width sorting means 40, 42, and 44 will produce an output at their associated output terminals 46, 48, and 50, respectively, only when a pulse appearing at terminal 13 has a width which falls within the particular predetermined limits set within each pulse width sorting means.

Figure 5:
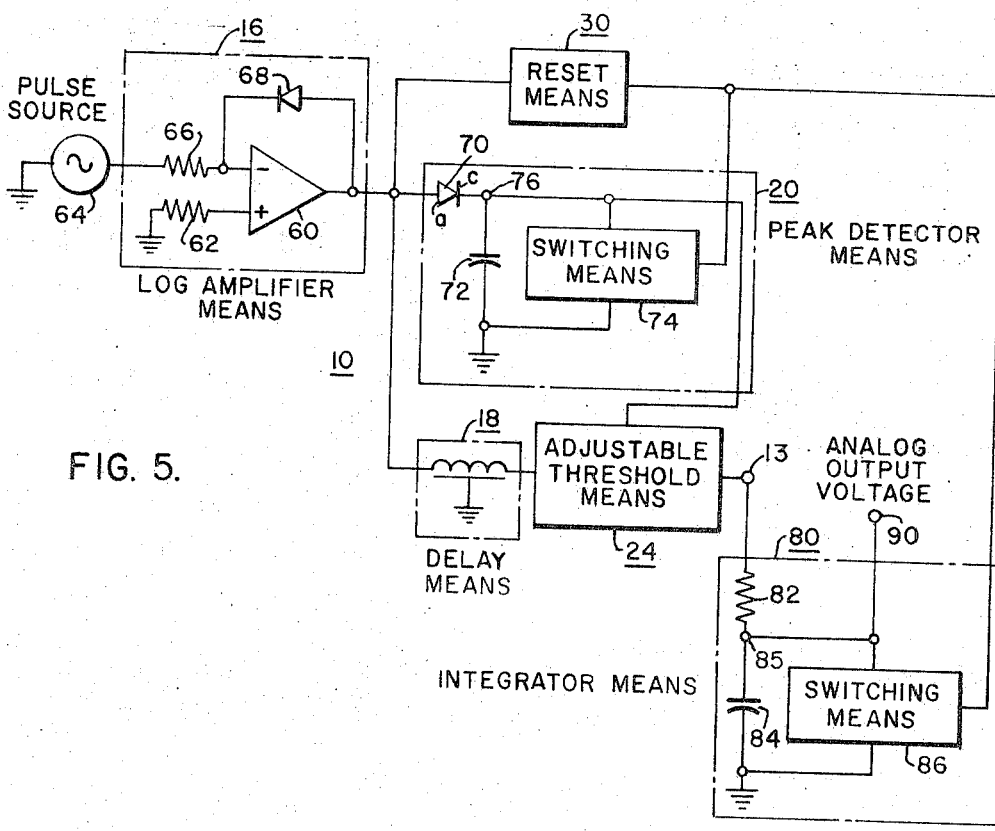
FIG. 5 is a block and schematic diagram illustrating the teachings of the invention in a circuit which provides an analog voltage output responsive to the width of a measured signal pulse.

Another application for pulse width measuring circuit 10 is to use the rectangular output signal to provide an analog voltage representative of the time duration of the input signal pulse. FIG. 5 is a schematic diagram which illustrates this application. Amplifier means 16, as shown in FIG. 5, is a logarithmic amplifier which provides an output pulse having an amplitude proportional to the logarithm of the input pulse. However, amplifier means may be a linear amplifier, if desired.

Logarithmic amplifier 16 includes an operational amplifier 60, having its non-inverting input connected to ground through resistor means 62, and its inverting input connected to a pulse source 64 through resistor means 66. Feedback from the output of the operational amplifier 60 to the inverting input is provided through asymmetrically conductive device 68, such as a silicon diode. The output of the logarithmic amplifier 16 is connected to delay means 18, to peak detector means 20, and to reset means 30.

Peak detector means 20 includes a capacitor 72, switching means 74, and an asymmetrically conductive device 70, such as a silicon diode having an anode electrode $a$, and a cathode electrode $c$. The anode electrode $a$ of diode 70 is connected to the output of logarithmic amplifier 16, and its cathode electrode $c$ is connected to capacitor 72 at junction 76. Capacitor 72 is connected from junction 76 to ground, and switching means 74 is connected across capacitor 72, which, in response to a reset signal from reset means 30, discharges capacitor 72. The voltage across capacitor 72, which is the peak voltage of the signal pulse, is applied to adjustable threshold means 24, and is the control voltage for setting the operating point of the adjustable threshold means for the signal pulse to be applied to the threshold means from the delay means 18.

The rectangular output pulse which appears at terminal 13, which has a constant fixed magnitude and a duration responsive to the measured pulse width of the signal pulse, is applied to integrator means 80. Integrator means 80 includes resistance means 82, a capacitor 84, and switching means 86. One side of resistance means 82 is connected to terminal 13, and the other side is connected to one side of capacitor 84 at terminal 85. Capacitor 84 is connected from junction 85 to ground, and switching means 86 is connected across capacitor 84, which, in response to a reset signal from reset means 30, discharges capacitor 84.

The voltage across capacitor 84 is the integral of the voltage appearing at terminal 13, when the time constant of the R-C circuit is selected to be large in comparison with the time required for the input signal to make an appreciable change. The voltage across capacitor 84, is, therefore a ramp voltage having a peak proportional to the pulse width of the rectangular output pulse appearing at terminal 13. The peak voltage across capacitor 84 is stored therein until receiving a reset signal from reset means 30. This stored voltage is the analog voltage of the width of the signal pulse from pulse source 64, and this voltage is applied to terminal 90. Terminal 90 is adapted for connection to apparatus for processing the information appearing at this terminal.

In summary, there has been disclosed a new and improved pulse width measuring circuit which accurately measures the pulse width of a signal pulse at an amplitude which is a predetermined percentage of the peak amplitude, over a wide range of peak amplitudes. Thus, the disclosed circuitry possesses advantages over prior art pulse measuring systems, which measure the pulse width at a constant predetermined amplitude.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A pulse width measuring circuit comprising:
    threshold means having first and second input terminals and an output terminal, said threshold means being of the type which provides an output signal at said output terminal having a predetermined fixed magnitude, during the time the magnitude of a signal applied to said first input terminal has a predetermined selected relationship with the magnitude of a signal applied to said second input terminal,
    peak detector means having an input terminal adapted to receive a pulse whose width is to be measured, and an output terminal which provides a signal having a magnitude responsive to the peak magnitude of said pulse, the output terminal of said peak detector means being connected to the second input terminal of said threshold means,
    and first delay means having input and output terminals, and the characteristic whereby a signal applied to its input terminal appears at its output terminal after a predetermined time delay, the input terminal of said delay means being adapted to receive the pulse whose width is to be measured, and the output terminal of said delay means being connected to the first input terminal of said threshold means,
    said peak detector means setting said threshold means in response to the peak magnitude of the pulse whose width is to be measured, with said threshold means providing at its output terminal a rectangular pulse of predetermined magnitude, having a time duration equal to the width of the pulse to be measured at a predetermined percentage of its peak amplitude.

2. The circuit of claim 1 including amplifier means adapted to receive and amplify the pulse whose width is to be measured, the output of said amplifier means being connected to the input terminals of said peak detector means and said delay means.

3. The circuit of claim 2 wherein said amplifier means is a linear amplifier, and the signal applied to the second input terminal of said threshold means sets said threshold means to provide an output signal during the time the signal applied to its first input terminal exceeds a predetermined selected percentage of the peak magnitude of the pulse whose width is to be measured.

4. The circuit of claim 2 wherein said amplifier means is a logarithmic amplifier, and the signal applied to the second input terminal of said threshold means sets said threshold means to provide an output signal during the time the signal applied to its first input terminal exceeds a value equal to the peak magnitude of the pulse whose width is to be measured, minus a predetermined fixed amount.

5. The circuit of claim 1 including reset means for resetting said peak detector means each time the pulse width of a signal pulse has been measured.

6. The circuit of claim 5 wherein said reset means includes serially connected delay and reset multivibrator means, with the delay multivibrator being adapted to receive the pulse whose width is to be measured, and with the reset multivibrator being connected to reset said peak detector means.

7. The circuit of claim 5 wherein said reset means includes serially connected second delay means and a reset multivibrator, with said second delay means being connected to the output terminal of said first delay means, and said reset multivibrator being connected to reset said peak detector means.

8. The circuit of claim 1 wherein said peak detector means includes a rectifier and capacitor, connected to charge said capacitor to the peak magnitude of the pulse whose width is to be measured, and including reset means for discharging said capacitor each time the width of a signal pulse has been measured.

9. The circuit of claim 1 including integrating means having input and output terminals, the input terminal of said integrating means being connected to the output terminal of said threshold means, said integrating means integrating the rectangular output signal from said threshold means, providing a peak output voltage at its output terminal which is the voltage analog of the pulse width of the signal pulse whose width is to be measured.

10. The circuit of claim 9 including reset means for resetting said peak detector means and said integrating means after the voltage analog of the signal pulse has been provided by said integrating means.

11. The circuit of claim 1 including pulse width sorting means connected to the output terminal of said threshold means.

References Cited

UNITED STATES PATENTS

| 2,866,896 | 12/1958 | Stampfl | 328—112X |
| 3,076,145 | 1/1963 | Copeland et al. | 328—165 |
| 3,319,170 | 5/1967 | Harmer | 328—117X |
| 3,415,950 | 12/1968 | Bartz et al. | 328—151X |
| 3,437,834 | 4/1969 | Schwartz | 328—165X |

STANLEY D. MILLER, Jr., Primary Examiner

U.S. Cl. X.R.

307—234, 235, 265; 328—116, 150